United States Patent Office 3,392,476
Patented July 16, 1968

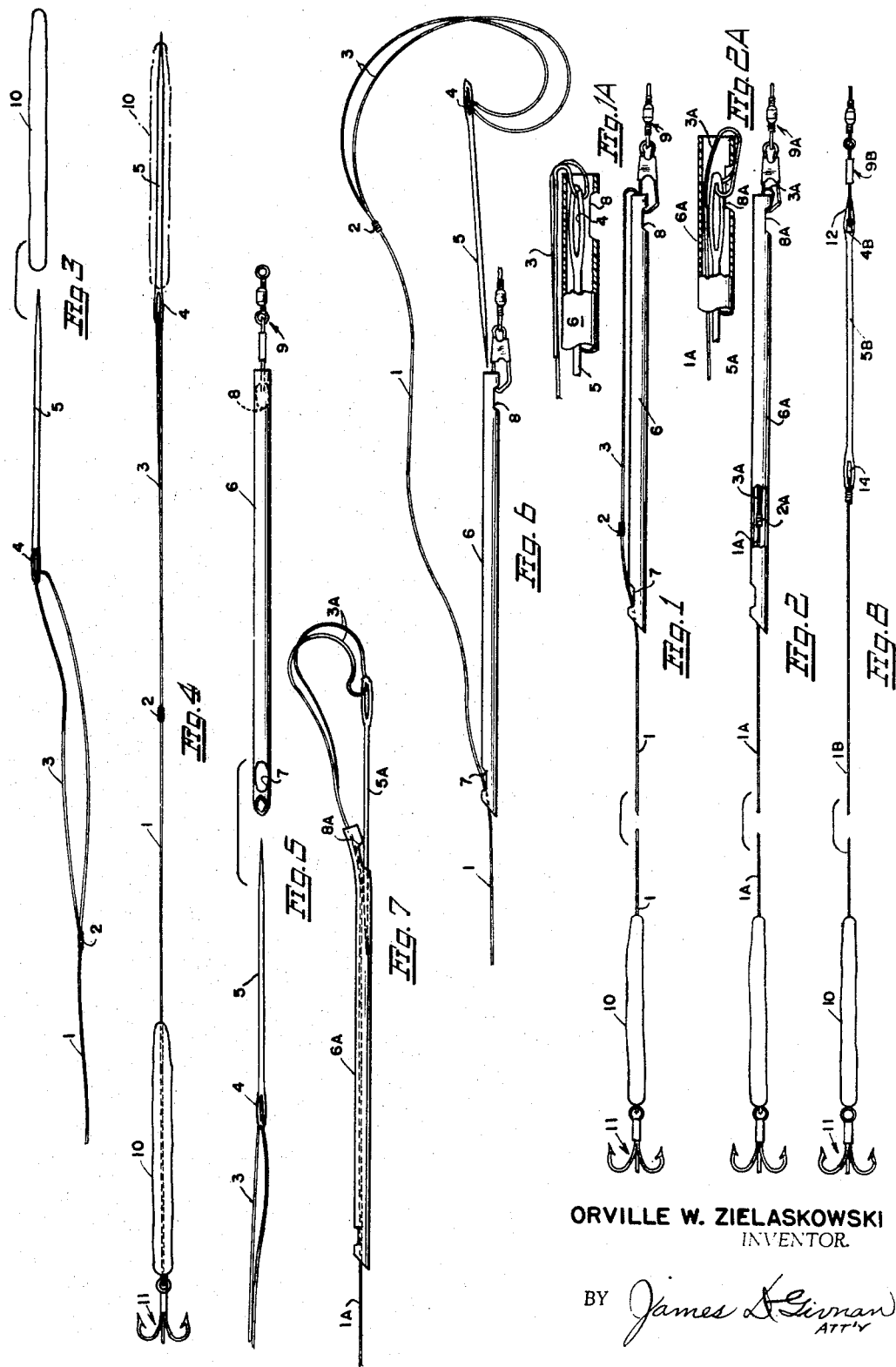

3,392,476
FISHING TACKLE
Orville W. Zielaskowski, 1204 N. 10th St.,
Corvallis, Oreg. 97330
Filed Sept. 24, 1965, Ser. No. 489,873
2 Claims. (Cl. 43—44.83)

ABSTRACT OF THE DISCLOSURE

Fishing tackle comprising a length of flexible tubing detachably secured to a fishing line, an aperture in the tubing wall adjacent one end thereof, a leader having a fish hook at one end and provided with a needle at the other end to be passed through the tubing and the aperture as the means for attaching the leader to the fishing line, the said tubing protecting the leader against the action of a striking fish or any other excessive lineal stresses encountered, in trolling or bait-casting operations.

This invention relates generally to fishing tackle whose principal object is to provide new and novel means for quickly and conveniently stringing a live worm or similar live bait on a fishing leader to a position either adjacent a treble or double hook or extended over the shank thereof if desired.

An equally important object of the invention is the utilization of a tubular sleeve in conjunction with the bait-attaching means for attaching the opposite end of the leader to a fishing line and protecting that end from the same resultant action of a striking fish, a snagged hook or any other excessive lineal stresses, encountered in trolling or bait-casting operations.

The invention also comprehends the provision of a tubular sleeve which, in addition to its purpose above stated, may, if desired, be of any suitable length and weight to render it effective as a streamlined and hence more compact and much less conspicuous replacement for conventional sinkers and other loosely dangling weighted fish-line appendages.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of fishing tackle made in accordance with my invention.

FIGURE 2 is a similar view of a modified form of the invention with a fragment broken away.

FIGURES 1A and 2A are enlarged fragmentary sectional detail views of the right hand end of FIGURES 1 and 2, respectively.

FIGURE 3 is a composite view illustrating a worm or similar live bait in position for being threaded onto one end of a fishing leader.

FIGURE 4 is a view showing the bait in the final stage of the threading operation.

FIGURE 5 is a composite view showing the threading needle in position for insertion into and projection out of one end of a tubular shield or housing.

FIGURE 6 is a similar view showing the needle in position for final insertion into the opposite end of the housing whereby the tackle when ready for use will have the appearance illustrated in FIGURE 1.

FIGURE 7 is a view similar to FIGURE 6 wherein the needle and attached leader are extended entirely through the housing with the leader doubled back at the forward end of the housing and the needle reversed for full rearward insertion so that the tackle will have the appearance illustrated in FIGURE 2; and FIGURE 8 is a side elevational view of a further modified form of the invention.

With continuing reference to the drawing wherein like reference characters designate like parts and particularly FIGURES 1 and 1A, reference numeral 1 indicates a fishing leader tied as at 2 near its forward end into a loop 3 threaded through the eye 4 of a needle 5. A shield or housing for the needle comprises a length of hollow plastic tubing 6 open at both of its ends and having a top aperture 7 near its trailing end and a bottom aperture 8 near its forward end. The forward end of the housing is secured to a fishing line, not shown, by hooked engagement with a snap swivel indicated generally at 9.

In baiting the tackle with live bait, such for instance as a worm 10, the bait is held in one hand of a user while the needle 5 is threaded through the bait with the other hand. The bait is then slid over the loop 3 and rearwardly along the leader until it reaches the opposite or trailing end thereof into a position where it abuts the eye of a fish hook indicated generally at 11, which may be of any desired type, such as the cluster hooks shown, or a single hook. The bait may be moved farther rearwardly to cover the shank of the hook if desired.

With the bait so attached, the leader, needle and housing 6 are ready for final assembly which is accomplished, as shown in FIGURE 6, by inserting the needle into the trailing end of the housing then upwardly and forwardly out of the aperture 7 a sufficient distance to provide enough slack in the looped end of the leader to allow reversing the needle for re-entry into the housing 6 at the forward end thereof.

With the parts in final assembly, as shown in FIGURES 1 and 1A, the loop 3 with its forward end drawn into the housing 6 by insertion of the needle 5 lies against or closely adjacent the exterior of the housing and is so held by encasement of the needle within the housing. The housing, as previously stated, is made of plastic, preferably of a somewhat resilient type, so that the end of the loop 3 turned back into the forward end of the housing will thereat be protected against any cutting action by a sudden rearward pull on the leader or by the impact of a fish striking the hook 11.

In the modified assembly illustrated in FIGURES 2 and 2A, the leader 1A is baited in the same manner as above described and then the needle 5A, loop 3A, and a trailing portion of the leader 1A as shown in FIGURES 7 and 2A, are passed entirely through the housing 6A then reversed for re-entry through the aperture 8A on the underside of the forward end of the housing. The needle, with the loop 3A now turned back on itself, is thrust rearwardly until the needle is entirely encased within the housing, as shown. The needle is thus held against displacement and the leader is protected against any cutting or chafing action in the same manner as in the first form of the invention. In addition thereto, the loop-forming knot 2A is protected against damage by its encasement within the housing.

In the further modification shown in FIGURE 8, I dispense with the tubular housing 6-6A and provide a needle 5B with one eye 4B at its forward or pointed end 12 and another eye 14 at its opposite or rearward end.

The rearward end of the needle is attached to the forward end of a leader 1B by a tied loop extending through the eye 14.

The live bait 10, by means of the needle 5B, is conveniently threaded onto the leader 1B to a position adjacent the hook 11 or extended over the shank thereof in the same manner as in the other forms of the invention.

Following this baiting operation, the forward end of the needle is attached to a fishing line, not shown, by means of a snap swivel 9B extending through the eye 4B.

Such direct attachment provides a stronger line and needle connection than that afforded by attaching the snap swivel to the forward end of the plastic tubular housing 6-6A.

While I have shown particular forms of embodiment of my invention, I am aware that many minor changes therein will readily suggest themselves to others skilled in the art without departing from the spirit and scope of the invention.

Having thus described my invention, what I claim as new and desire to protect by Letters Patent is:

1. Fishing tackle comprising a length of fishing leader having a forward end and a trailing end,
   - a fish hook secured to the trailing end of the leader and the forward end of the leader terminating in a loop,
   - a needle attached to the leader by means of said loop,
   - an elongated hollow flexible tubular housing having a forward end and a rearward end, and an upwardly opening aperture at its rearward end and downwardly opening aperture at its forward end,
   - said leader extending into the rearward end of said housing upwardly through said upwardly opening aperture, lengthwise of the housing exteriorly thereof with the forward end of the loop turned back on itself to the interior of the housing by insertion of the needle into said forward end thereof, and
   - means removably attached to the forward end of the housing by means of said downwardly opening aperture therein for attaching the housing to a fishing line.

2. Fishing tackle comprising a length of fishing leader having a forward end and a trailing end,
   - a fish hook secured to the trailing end of the leader and the forward end of the leader terminating in a loop,
   - a needle attached to the leader by means of said loop,
   - an elongated hollow flexible tubular housing having a forward end and a rearward end, and an upwardly opening aperture at its rearward end and downwardly opening aperture at its forward end,
   - said leader extended lengthwise through said housing by said needle and turned back on itself and into the housing by re-entry of the needle through said forward aperture to thereby loop the leader around the end of the housing wall adjacent said aperture, and
   - means removably attached to the forward end of the housing by means of said downwardly opening aperture therein for attaching the housing to a fishing line.

References Cited

UNITED STATES PATENTS

| | | | |
|---|---|---|---|
| 1,915,876 | 6/1933 | Wallace | 43—44.83 |
| 2,748,524 | 6/1956 | Schinzel | 43—44.83 |

SAMUEL KOREN, *Primary Examiner.*

D. J. LEACH, *Assistant Examiner.*